(12) United States Patent
Shimotsu

(10) Patent No.: US 6,802,548 B2
(45) Date of Patent: Oct. 12, 2004

(54) SHOCK ABSORBER

(75) Inventor: Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 10/771,791

(22) Filed: Feb. 4, 2004

(65) Prior Publication Data

US 2004/0169383 A1 Sep. 2, 2004

(30) Foreign Application Priority Data

Feb. 28, 2003 (JP) ........................................ 2003-053882

(51) Int. Cl.[7] ............................................. B60R 19/34
(52) U.S. Cl. ...................................... 293/133; 188/371
(58) Field of Search ............................... 293/132, 133; 188/371, 377

(56) References Cited

U.S. PATENT DOCUMENTS 3,850,466 A * 11/1974 Yepis ......................... 293/132
6,334,638 B1 * 1/2002 Yamamuro et al. ......... 293/133
6,554,333 B2 * 4/2003 Shimotsu et al. ........... 293/132

FOREIGN PATENT DOCUMENTS

DE 3711692 10/1988
JP 2001-158312 6/2001

* cited by examiner

Primary Examiner—Joseph D. Pape
(74) Attorney, Agent, or Firm—Koda & Androlia

(57) ABSTRACT

A shock absorber comprising a first collapsible shock absorbing part and a second shock absorbing part adapted to be compressed in an axial direction thereof inclined outward in the width direction of a vehicle. The first shock absorbing part has a structure of a basin-like truncated conical shape having a bead integrally formed therewith. The direction of the transmission of an impact force F is corrected by utilizing this first shock absorbing part to an axial direction of the second shock absorbing part, and the second shock absorbing part is thereby compressed in the axial direction without inclining the second shock absorbing part.

6 Claims, 13 Drawing Sheets

SHOCK ABSORBER

BACKGROUND OF THE INVENTION

1. Field of the Invention

This invention relates to a shock absorber adapted to support a bumper reinforcement member on a body member of a vehicle.

2. Description of the Related Art

A shock absorber adapted to absorb an impact exerted on a bumper reinforcement member is used as a member for supporting the bumper reinforcement member on a body member. When the bumper reinforcement member is bent in a projecting state frontward in the length direction of the vehicle, an impact received by the bumper reinforcement member is exerted on the shock absorber in the diagonal direction thereof to cause the shock absorber to be inclined. When the shock absorber is of the type which absorbs impact energy owing to the plastic deformation thereof, the impact energy cannot be absorbed satisfactorily due to an inclination of the shock absorber.

Regarding this point, a shock absorber (Halteglied) disclosed in the German Patent No. 3711692 is joined to a bumper reinforcing member (Stoβstange) with a predetermined degree of freedom provided in a horizontal plane but a general construction of the shock absorber becomes complicated. In view of this, a bumper reinforcement member of the invention disclosed in JP-A-2001-158312 is provided with an engagement portion, which is engaged with an outer end portion of a shock absorber (or a shock absorbing member) when a collision of a vehicle occurs in which the bumper reinforcement is displaced in the length direction of the vehicle, for the purpose of preventing a cost increase caused by the complication of the general construction of the shock absorber, and eliminating a scatter of a shock absorbing performance occurring due to, especially, an inclining movement of the shock absorber in the outward direction of the vehicle. Furthermore, a flat plate type bumper stay is laid between the bumper reinforcement and a body member so that the bumper stay holds the shock absorber (or the shock absorbing member) therebetween.

Although the construction of the invention disclosed in JP-A-2001-158312 is certainly simple as compared with that of the invention disclosed in the German Patent No. 3711692, the impact energy is also absorbed in the flat plate type bumper stay the shock absorbing performance of which is hard to predict, so that a new problem arises, i.e., a stable shock absorbing performance is difficult to be obtained. However, when the bumper stay is not provided, there is the possibility that an outer end portion of the'shock absorber (or the shock absorbing member) which is distant from the engagement portion provided on the bumper reinforcement be not engaged well with the engagement portion. When the outer end portion of the shock absorber is not engaged well with the engagement portion of the bumper reinforcing member, the inclining of the shock absorber necessarily occurs.

The shock absorber disclosed in JP-A-2001-158312 is provided with a bead which permits the bumper stay to be bent so that the bumper stay does not disturb the shock absorber (shock absorbing member) from absorbing an impact. In this case, however, another problem arises in that the bumper stay flares the bumper reinforcement in the vertical direction. Especially, in the bumper reinforcement of a cross-sectionally opened structure disclosed as an example in JP-A-2001-158312, it may suddenly decrease section modulus of the bumper reinforcement opened vertically.

Therefore, a shock absorber capable of displaying a necessary and sufficient shock absorbing performance without being inclined even when the axial direction of the shock absorber is inclined outward with respect to the width direction of a vehicle and crosses the bumper reinforcing member at the right angles thereto.

SUMMARY OF THE INVENTION

The shock absorber according to the present invention is adapted to support a bumper reinforcing member of a vehicle and absorb by the plastic deformation of the shock absorber an impact exerted on the bumper reinforcing member, the shock absorber comprising a first collapsible shock absorbing part, and a second shock absorbing part to be compressed in the axial direction thereof inclined outward in the width direction of the vehicle, the first shock absorbing part having a structure of a basin-like truncated conical shape and including a skirt-shaped side surface, a top surface surrounded by a smaller-diameter-side circumferential edge of the side surface, an annular flange surface projecting from a larger-diameter-side circumferential edge of the side surface in the radially outward direction, and a bead integrally formed on the side surface in connection between the larger-diameter-side circumferential edge and the smaller-diameter-side circumferential edge, whereby the shock absorber has a function of aligning a direction in which the impact exerted on the bumper reinforcing member with the axial direction of the second-shock absorbing part while absorbing the same impact, and the second shock absorbing part having a function of absorbing an impact transmitted from the first shock absorbing part.

The first shock absorbing part may have a structure of a basin-like truncated pyramid shape, and preferably a structure of a basin-like truncated conical shape. When the first shock absorbing part has a polyhedral conical shape or a truncated conical shape, a collapse of the side surface except a bead-formed part thereof becomes substantially uniform in the circumferential direction, so that a designed shock absorbing performance can be displayed. In this first shock absorbing part, the top surface is brought into contact with a front end of the second shock absorbing part with the top surface faced rearward with respect to the length direction of a vehicle, or the flange surface is brought into contact with the front end of the second shock absorbing part with the top surface faced frontward with respect to the length direction of the vehicle.

The second shock absorbing part serves the purpose as long as this shock absorbing part is compressed axially and absorbs an impact. The second shock absorbing part may be of a cylindrical structure, and preferably of a multistage tubular structure in which a smaller-diameter tube portion and a larger-diameter tube portion formed by partially reducing or partially increasing the diameter of a straight tube, and which are connected together via a stepped portion in which boundary regions of the smaller-diameter and larger-diameter tube portions are folded back into each other to put these tube sections in a previously absorbed state. In this embodiment, the first shock absorbing part is formed by bringing the top surface thereof into contact with a front end of the smaller-diameter tube portion of the second shock absorbing part with the top surface faced rearward with respect to the length direction of a vehicle, or by bringing the annular flange surface thereof into contact with the front end of the smaller-diameter tube portion of the second shock absorbing part with the top surface faced forward with respect to the length direction of the vehicle.

In the shock absorber according to the present invention, a shock transmission direction is corrected by a collapse of the first shock absorbing part, and the inclination of the second shock absorbing part is thereby prevented. Thus, the second shock absorbing part being collapsed in the initial inclined axial direction. For example, when the bumper reinforcing member is bent forward in a projecting state in the length direction of the vehicle, a shock causes the bumper reinforcing member to be deformed so that the radius of bend thereof becomes smaller, and the deformation of this bumper reinforcing member gives the second shock absorbing part a force for inclining the second shock absorbing part outward in the width direction of the vehicle. In the first shock absorbing part, the rigidity of an outer side in the width direction of the vehicle of the side surface is set higher than that of an inner side in the width direction of the vehicle of the side surface owing to the bead formed on the outer side in the width direction of the vehicle of the side surface. According to this structure, the side surface of the first shock absorbing part collapses a little at the outer side in the width direction of the vehicle, and, conversely, much at the inner side in the width direction of the vehicle. The first shock absorbing part having different quantities of collapse at the inner and outer sides thereof with respect to the width direction of the vehicle corrects the shock transmission direction so that the shock transmission direction is aligned with the axial direction of the second shock absorbing part, to thereby prevent the inclining of the second shock absorbing part.

The outward inclination of the axis of the shock absorber in the width direction of the vehicle occurs when the shock absorber supports the bumper reinforcing member at right angles to a contact surface thereof with respect to the bumper reinforcing member bent forward in a projecting state in the length direction of the vehicle. Even when the bumper reinforcing member is formed straight with the axial direction of the shock absorber inclined either inward or outward with respect to the width direction of the vehicle, the present invention can be applied to the shock absorber.

Concretely, the direction in which the second shock absorbing part is inclined is; (1) a direction in which a crossed axes angle (which will hereinafter be referred to as a bumper crossed axes angle) oh the front side with respect to the length direction of the vehicle and formed between a tangential direction of the bumper reinforcing member and the axial direction of the shock absorber is smaller than 90 degrees; or (2) a direction in which a crossed axes angle (which will hereinafter be referred to as a vehicle crossed axes angle) on the front side in the length direction of the vehicle and formed between the width direction of the vehicle and the axial direction of the shock absorber is smaller than 90 degrees. In view of this, the setting of different quantities of collapse of the first shock absorbing part with a bumper crossed axes angle not 90 degrees (not having orthogonally crossed relation) may be done by providing a bead on the side on which the shock absorber is inclined toward the side having a bumper crossed axes angle of smaller than 90 degrees. The setting of different quantities of collapse of the first shock absorbing part with a vehicle crossed axes angle not 90 degrees (not having orthogonally crossed relation) may be done by providing the bead on the side on which the shock absorber is inclined toward the side having a vehicle crossed axes angle of smaller than 90 degrees. In the shock absorber supporting the bumper reinforcing member which is bent forward in a projecting state in the length direction of the vehicle, the inclination of the second shock absorbing part occurs generally outward in the width direction of the vehicle, and the bead is therefore provided on the outer side in the width direction of the vehicle of the side surface of the first shock absorbing part. However, when the above-mentioned condition is met, the bead may be provided on the inner side in the width direction of the vehicle of the side surface of the first shock absorbing part.

More concretely, the first shock absorbing part includes a bead integrally provided on the side surface thereof and having a cross-sectionally triangular shape, an opening angle within the range of plus or minus 45 degrees in the circumferential direction of the top surface at a center line extending outward from the center of the top surface in the width direction of the vehicle, and extends in connection between the larger-diameter-side circumferential edge and the smaller-diameter-side circumferential edge. When the angle at which the cross-sectionally triangular bead extends exceeds plus minus 45 degrees in the circumferential direction around the width direction of the vehicle as the center, the improvement of rigidity of the first shock absorbing part due to the existence of the bead extends over the whole of the first shock absorbing part, so that a difference in rigidity, in its turn, a difference in the degree of a collapse of the inner and outer side sections of the first shock absorbing part in the width direction of the vehicle does not occur. This inconvenience will be described in relation to the size of the top surface of the first shock absorbing part. That is, a first shock absorbing part includes a bead integrally provided on a side surface thereof and having a cross-sectionally triangular shape, an opening side length within the range of 0.1 to 0.7 times as large as a diameter of the top surface at a center line extending outward from the center of the top surface in the width direction of the vehicle, and extends in connection between the larger-diameter-side circumferential edge of a first shock absorbing part and the smaller-diameter-side circumferential edge thereof. Strictly speaking, 0.7 times the diameter of the top surface is equal to 1/root 2 thereof, i.e. a sine value at an angle of 45 degrees. In addition, 0.1 times the diameter of the top surface represents a lower limit value at which a normal bead molding operation can be carried out.

Instead of the cross-sectionally triangular bead, a cross-sectionally sector-shaped bead may be used. Namely, the first shock absorbing part is integrally provided on the side surface thereof with a bead having a cross-sectionally sector having an opening angle within the range of plus or minus 45 degrees in the circumferential direction of the top surface at a center line extending outward from the center of the top surface in the width direction of the vehicle, and extends in connection between the larger-diameter-side circumferential edge and the smaller-diameter-side circumferential edge. The first shock absorbing part may also be integrally provided on a side surface thereof with a bead having a cross-sectionally sector having an opening side length within the range of 0.1 to 0.7 times as large as a diameter of the top surface at a center line extending outward from the center of the top surface in the width direction of the width of the vehicle, and extends in connection between the larger-diameter-side circumferential edge of the first shock absorbing part and the smaller-diameter-side circumferential edge thereof.

When the shock absorber according to the present invention supports a bumper reinforcing member of a cross-sectionally closed structure having a front surface and a rear surface, the following three support structures can be exemplified.

(a) A structure formed by connecting an annular flange surface of a first shock absorbing part to a front surface of a bumper reinforcing member, connecting a top surface of the first shock absorbing part to a front end of a smaller-diameter tube portion of a second shock absorbing part, and connecting a rear end of a larger-diameter tube portion of the second shock absorbing part to a front portion of a body member, (b) a structure formed by connecting the annular flange surface of the first shock absorbing part to the front surface of the bumper reinforcing member, connecting a side surface of the smaller-diameter tube portion of the second shock absorbing part to a rear surface of the bumper reinforcing member, bringing the top surface of the first shock absorbing part and a front end of the smaller-diameter tube portion of the second shock absorbing part into contact with each other, and connecting the rear end of the larger-diameter tube portion of the second shock absorbing part to the front portion of the body member, and (c) a structure formed by bringing the annular flange surface of the first shock absorbing part into contact with the front surface of the bumper reinforcing member, connecting the top surface of the first shock absorbing part to the front end of the smaller-diameter tube portion of the second shock absorbing part, connecting the side-surface of the smaller-diameter tube portion of the second shock absorbing part to the rear surface of the bumper reinforcing member, and connecting the rear end of the larger-diameter tube portion of the second shock absorbing part to the front portion of the body member. Bolts may be used for each part to be connected, and a welding method may also used when the parts need to be connected firmly.

The first shock absorbing part having a structure of a basin-like truncated conical shape is easily collapsed as compared with the second shock absorbing part of a cylindrical or a multistage tubular structure. Therefore, the first shock absorbing part is collapsed when such a low-speed collision of a vehicle occurs that does not cause the second shock absorbing part to be plastically deformed, to absorb an impact. When a high-speed collision of the vehicle occurs, the first shock absorbing part is collapsed to absorb an impact, while correcting an impact transmission direction. The second shock absorbing part is then compressed to absorb the impact.

Thus, in the shock absorber according to the present invention, the first shock absorbing part is collapsed to absorb an impact when a low-speed collision of a vehicle occurs at which time the second shock absorbing part is not compressed. When a high-speed collision occurs, the first shock absorbing part is collapsed while correcting a shock transmission direction, and thereby the second shock absorbing part can be compressed without being inclined. This enables a required and sufficient shock absorbing performance of the shock absorber to be displayed in a range of a low-speed collision of the vehicle to a high-speed collision thereof.

Further, the shock absorber according to the present invention is not required to have a bumper stay additionally. Even when the present invention is applied to a bumper reinforcing member of a cross-sectionally opened structure, sudden drop of section modulus thereof can be avoided.

Besides these, the first shock absorbing part is fixed previously to the bumper reinforcing member or to a fixing aid, so that the second shock absorbing part connected to or engaged with the first shock absorbing part can be positioned with respect to the bumper reinforcing member. This causes the improvement of the assembling efficiency to the shock absorber.

BRIEF DESCRIPTION OF THE DRAWINGS

Preferred embodiments of the present invention will now be described with reference to the accompanying drawings.

DESCRIPTION OF THE PREFERRED EMBODIMENTS

Embodiments of the present invention will now be described with reference to the drawings.

Figure 1:
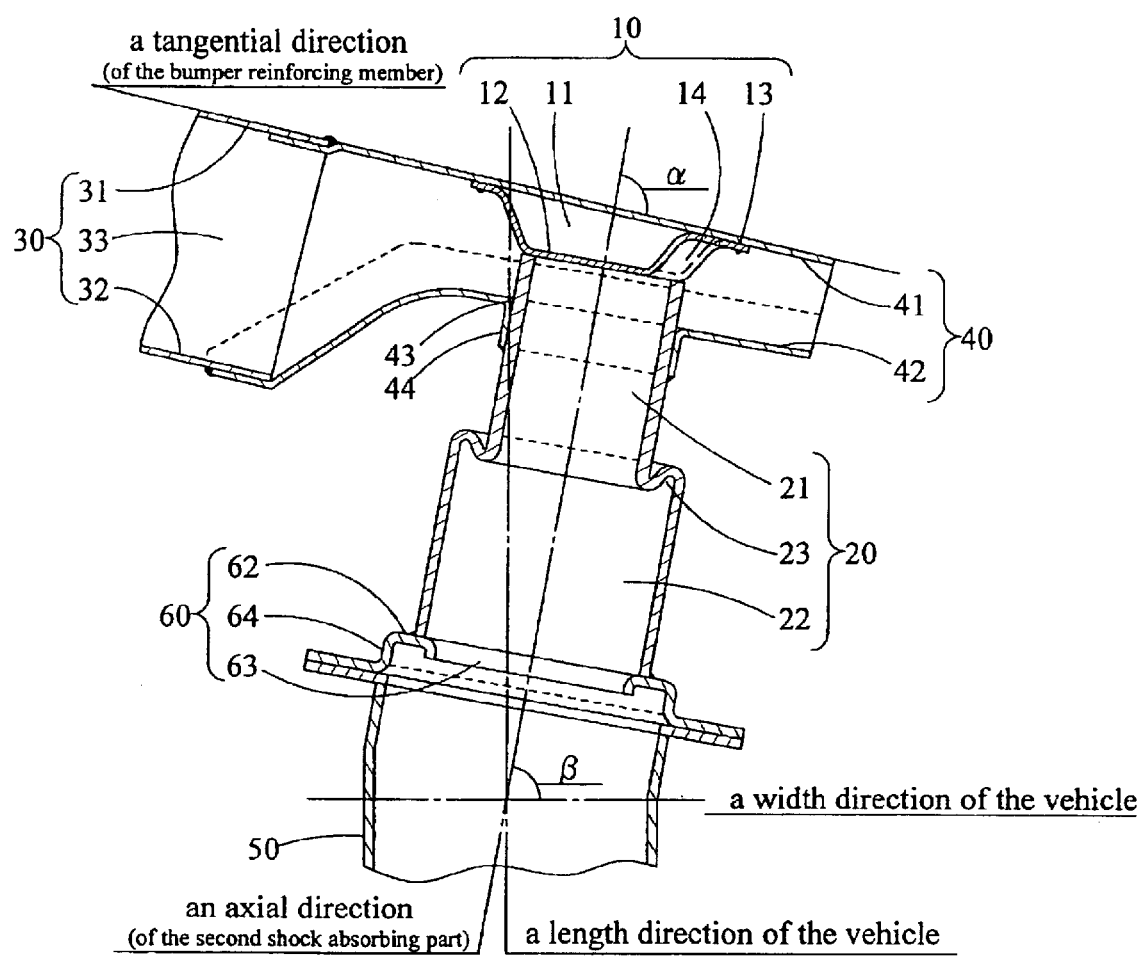
FIG. 1 is a sectional view of a shock absorber showing an embodiment of the present invention.
Figure 2:
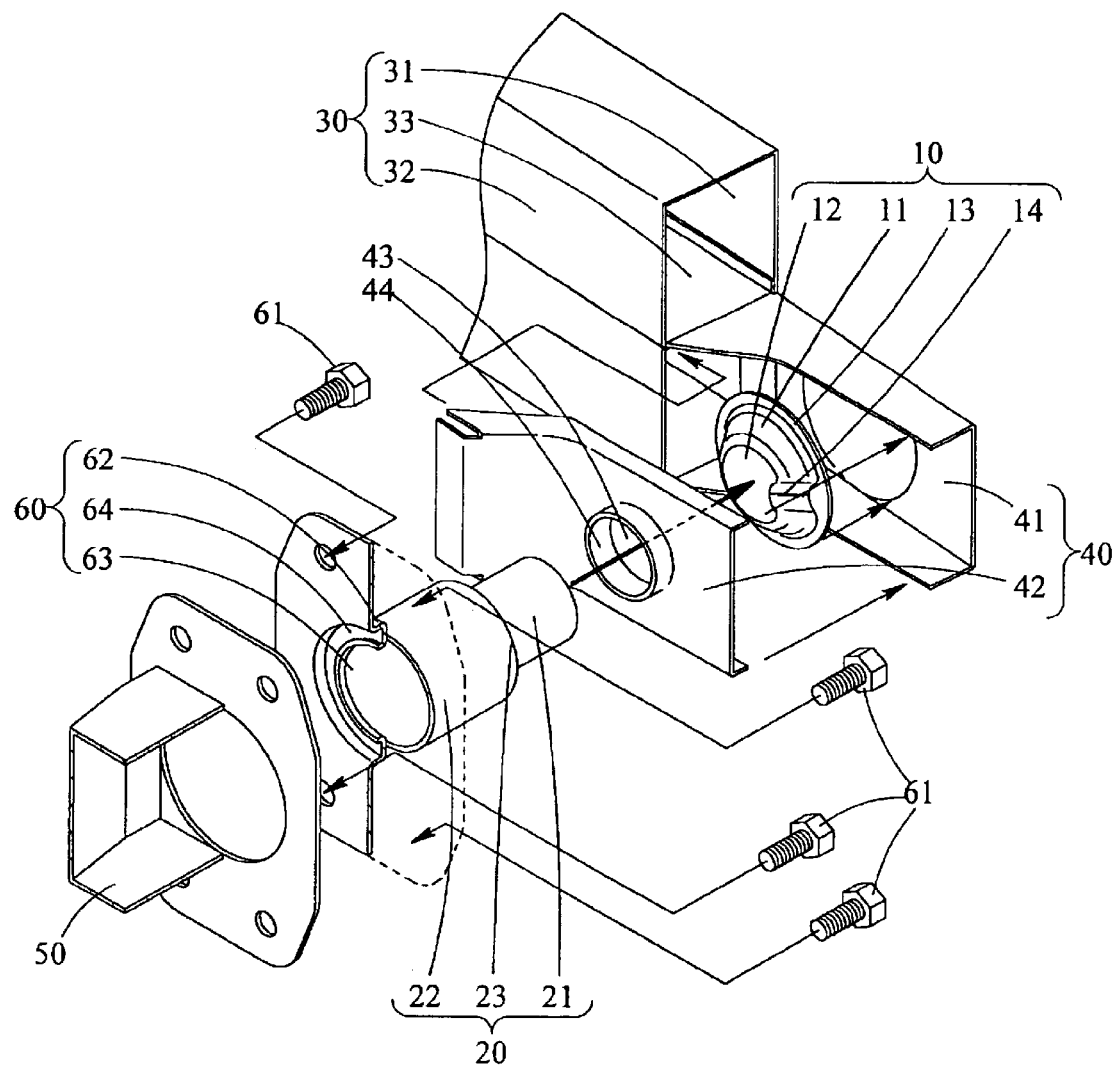
FIG. 2 is an exploded perspective view of the shock absorber shown in FIG. 1.

As seen in FIG. 1 and FIG. 2, the shock absorber in this embodiment includes a first shock absorbing part 10 having a structure of a basin-like truncated conical shape with an inclined side surface 11 obtained by opening a front side thereof or converging thereof rearwardly; and a second shock absorbing part 20 having a multistage tubular structure in which a smaller-diameter tube portion 21 and a larger-diameter tube portion 22 formed by partially reducing or partially increasing the diameter of a straight tube are connected together via a stepped portion 23 in which boundary regions of the smaller-diameter tube portion 21 and larger-diameter tube portions are folded back into each other to put these tube portions in a previously absorbed state.

Figure 3:
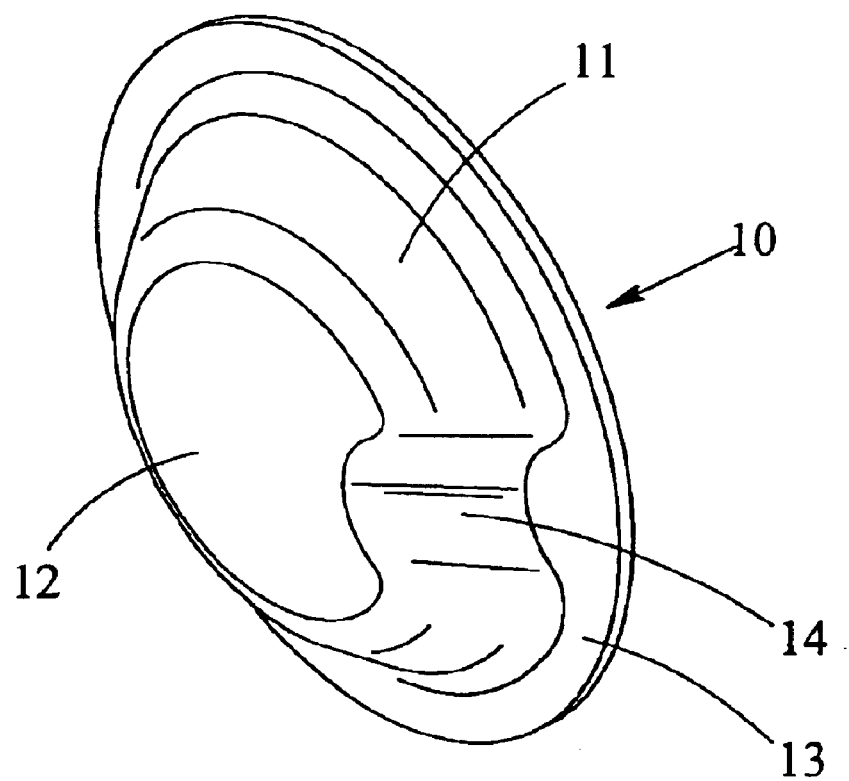
FIG. 3 is a perspective view of a first shock absorbing part having a cross-sectionally sector shaped bead.
Figure 4:
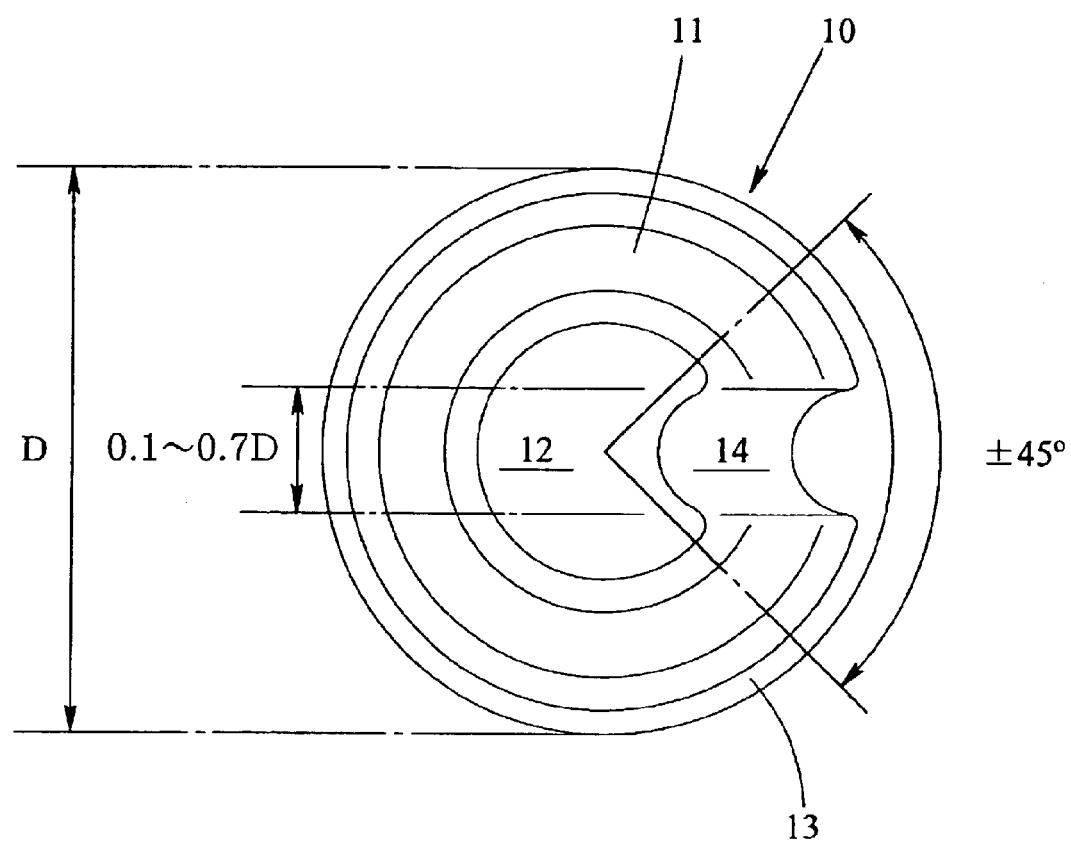
FIG. 4 is a plan view of the first shock absorbing part shown in FIG. 3.
Figure 5:
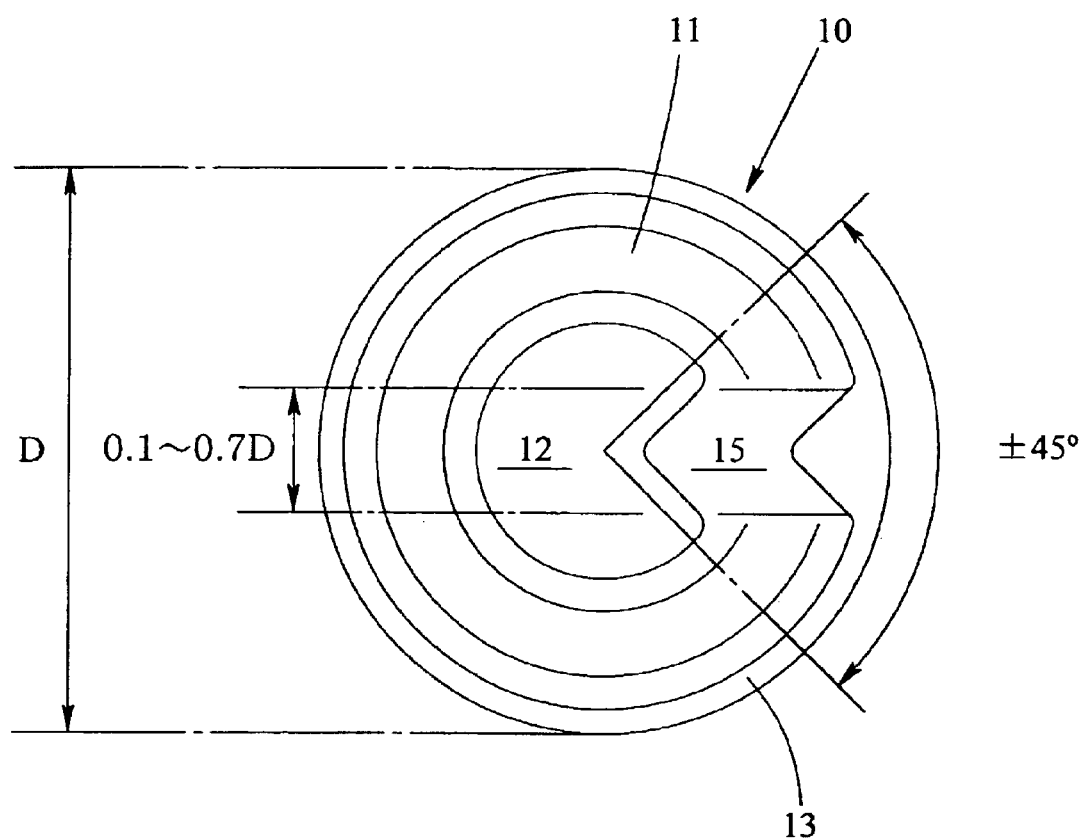
FIG. 5 is a plan view of the first shock absorbing part having a cross-sectionally triangular shaped bead, as another example of the first shock absorbing part shown in FIG. 3.

As seen in FIG. 2 and FIG. 3, the first shock absorbing part 10 has a top surface 12 surrounded by a smaller-diameter-side circumferential edge of a side surface 11, and an annular flange surface 13 projecting from a larger-diameter-side circumferential edge of the side surface 11 in the radially outward direction, and a bead 14 provided in the section of the side surface 11 which is on the outer side with respect to the width direction of a vehicle and which connects the larger-diameter-side circumferential edge and smaller-diameter-side circumferential edge together in one body. The bead 14 in this embodiment is shaped in a concave groove in inward radius direction of the top surface of the first shock absorbing part, and the rigidity of the side surface 11 is set in which an outer portion thereof in the width direction of the vehicle is higher than that of an inner portion thereof. The quantity of a collapse of the outer portion in the width direction of the vehicle of the side surface 11 is thereby set smaller than that of a collapse of the inner portion in the width direction of the vehicle of the side surface 11. The bead may have a sector cross-section as seen in FIG. 3 and FIG. 4, and a triangular cross section as seen in FIG. 5. The bead may also be made of a radially outwardly directed ridge.

While the smaller-diameter tube portion 21 of the second shock absorbing part is absorbed in the larger-diameter tube portion 22 thereof by an impact force F transmitted from a bumper reinforcing member 30 thereto via the first shock absorbing part 10, the second shock absorbing part converts the impact energy into deformation energy owing to the plastic deformation of the stepped portion 23 and smaller-diameter tube portion absorbing in the inner side of the larger-diameter tube portion 22, and absorbs the impact energy.

The bumper reinforcing member 30 has a structure of a closed cross-sectional shape which is formed by bending one piece of raw plate by roll molding, and which includes a reinforcing rib 33 connecting a front surface portion 31 and a rear surface portion 32 together. The whole of the bumper reinforcing member 30 is bent forward in a projecting state in the length direction of the vehicle. The bumper reinforcing member to which the present invention can be applied is not limited to a bumper reinforcing member having a structure of a closed cross-sectional shape, and the bumper reinforcing member may also have a structure of an opened cross-sectional shape. The bumper reinforcing member having a structure of either an opened or closed cross-sectional shape may be supported directly by the shock absorber without supported via a fixing aid 40 as described later.

In the above-described shock absorber, an annular flange surface 13 of the first shock absorbing part 10 and the side surface of the smaller-diameter tube portion 21 of the second shock absorbing part 20 are connected to the fixing aid 40 extending from an end of the bumper reinforcing member 30. The rear end of the larger-diameter tube portion 22 of the second shock absorbing part 20 is connected to a support aid 60 provided on a front end of a side member 50 constituting a body member.

Concretely, the first shock absorbing part 10 is installed in such a manner that the annular flange surface 13 thereof is brought into contact with a front surface portion 41 of the fixing aid 40 extending from an end of the bumper reinforcing member 30 in the tangential direction thereof, and a circumferential edge of the annular flange surface 13 is fixed firmly to the front surface portion 41 of the fixing aid 40 by welding. The second shock absorbing part 20 is installed in such a manner that the smaller-diameter tube portion 21 is inserted into an insert hole 43 opened in a rear surface portion 42 of the fixing aid 40 by burring, a circumferential surface 44 folded back from the insert hole 43 toward the second shock absorbing part 20 and the side surface of the smaller-diameter tube portion 21 are brought into contact with each other, an edge of the circumferential surface 44 is fixed to the side surface of the smaller-diameter tube portion by welding, a rear end of the larger-diameter tube portion 22 is brought into contact with the support aid 60 fixed to the front end of the side member 50, and a circumferential edge of the rear end of the larger-diameter tube portion 22 is fixed to the support aid 60 by welding. Namely, in the shock absorber of this embodiment, the first shock absorbing part 10 and second shock absorbing part 20 are not directly connected to each other but combined with each other via the fixing aid 40.

The fixing aid 40 includes the front surface portion 41 and the rear surface portion 42, and is adapted to offset a difference in the specifications of the bumper reinforcing member 30 and facilitate an operation of the shock absorber for supporting the bumper reinforcing member 30. The second shock absorbing part 20 is inserted into the insert hole 43 opened in the rear surface portion 42 of the fixing aid 40, and brought into contact with the top surface 12 of the first shock absorbing part 10 fixed to the front surface 41. The rear surface portion 42 is provided with the circumferential surface 44 formed by folding back the circumferential edge of the insert hole 43 toward the second shock absorbing part 20, and the side surface of the smaller-diameter tube portion 21 of the second shock absorbing part 20 is welded to the circumferential surface 44.

The support aid 60 is fixed in a covering state to a front end of the hollow side member 50 by bolts 61 to form a support surface 62 with which a rear end of the larger-diameter tube portion 22 of the second shock absorbing part 20 can be engaged. The support aid 60 in this embodiment is provided with a tube passage hole 63 which permits the smaller-diameter tube portion 21, which is absorbed in the larger-diameter tube portion 22 owing to the plastic deformation thereof, to be further absorbed in a position of the side member 50, and a circumferential portion of this tube passage hole 63 is raised to form an annular bead 64. The rear end of the larger-diameter tube portion 22 of the second shock absorbing part 20 is brought into contact with the support surface 62 of the annular bead 64 and fixed thereto by welding.

In this embodiment, a crossed axes angle a of the bumper is not 90 degrees, so that the annular flange surface 13, which extends in the tangential direction of the bumper reinforcing member 30, of the first shock absorbing part 10 and the top surface 12, which extends in the direction in which the front end of the smaller-diameter tube portion 21 of the second shock absorbing part 20 extends, are not parallel to each other. Therefore, the first shock absorbing part 10 has a structure of an asymmetric cross-sectional shape in which a bus bar (a tangential line extending in the direction in which the side surface 11 inclines) of the side surface 11 is longer on the outer side, on which the bead 14 is formed, with respect to the width direction of the vehicle, and shorter on the inner side with respect to the width direction of the vehicle. For this reason, the outer side, on which the bus bar is longer, in the width direction of the vehicle of the side surface 11 becomes easier to be collapsed, naturally. However, since the present invention is provided with the bead 14 on the outer side with respect to the width direction of the vehicle of the side surface 11, the inner side in the width direction of the vehicle of the side surface becomes relatively easier to be collapsed.

Figure 6:
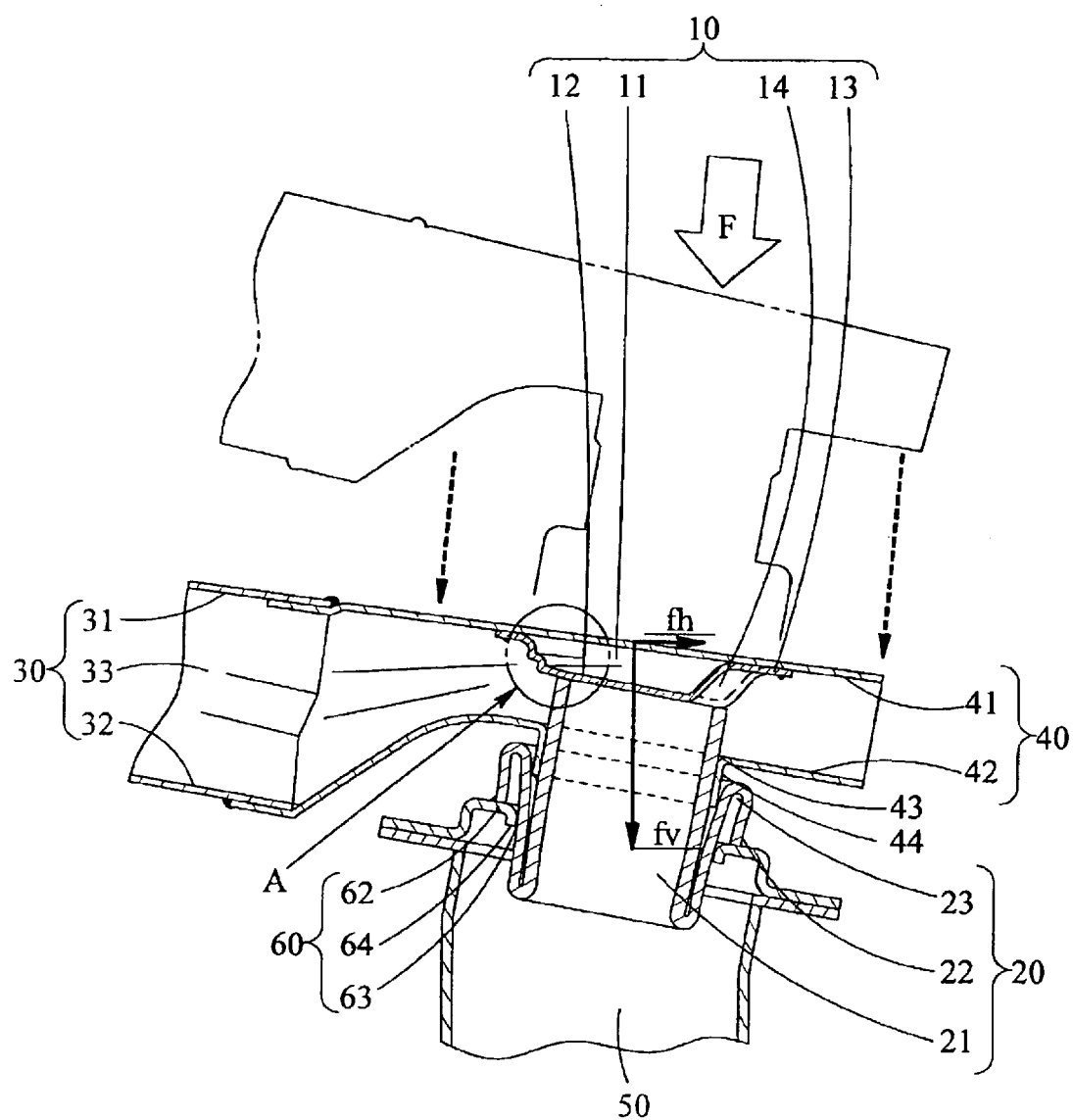
FIG. 6 is a cross-sectional view corresponding to FIG. 1, showing a shock absorber with an impact force F exerted thereon.

When an impact force F is exerted from the front side on the bumper reinforcing member 30 as seen in FIG. 6, the impact force F separates into a component of force fv in the length direction of the vehicle and a component of force fh in the width direction thereof, and is first exerted on the first shock absorbing part 10. During this time, the component of force fh works to incline the smaller-diameter tube portion 21 of the second shock absorbing part 20 outward in the width direction of the vehicle. When the component of force fh then becomes smaller, the absorption of the impact energy can be done sufficiently while holding down or preventing the inclination of the smaller-diameter tube portion 21 of the second shock absorbing part 20 and ensuring the smooth absorption of the smaller-diameter tube portion 21 into the larger-diameter tube portion 22.

The first shock absorbing part 10 receives the component of force fv and is collapsed (at a part shown by an arrow A in FIG. 6) in accordance with a backward movement of the bumper reinforcing member 30. Even when the inner side with respect to the width direction of the vehicle of the side surface 11 of the first shock absorbing part 10 in this embodiment is collapsed, the outer side with respect to the width direction of the side surface 11 is hardly collapsed by the bead 14 formed on the outer side with respect to the width direction of the vehicle. The bias of the collapse of the first shock absorbing part 10 makes the component of force fh smaller to correct the direction of the transmission of the impact. This causes the direction of the transmission of the impact to agree with the axial direction of the second shock absorbing part 20, so that the inclination of the smaller-diameter tube portion 21 of the second shock absorbing part 20 can be suppressed or prevented.

Figure 7:
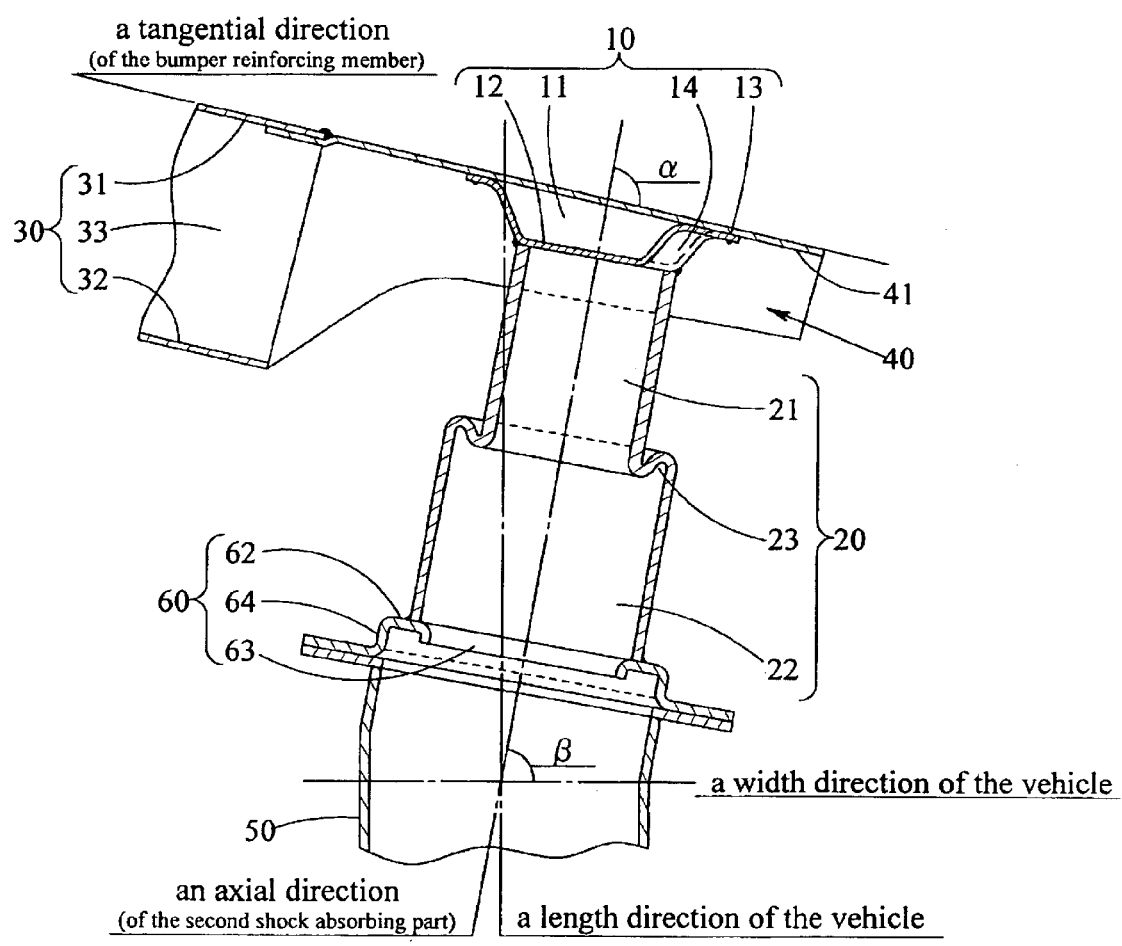
FIG. 7 is a cross-sectional view of a shock absorber, showing another example of the present invention.
Figure 8:
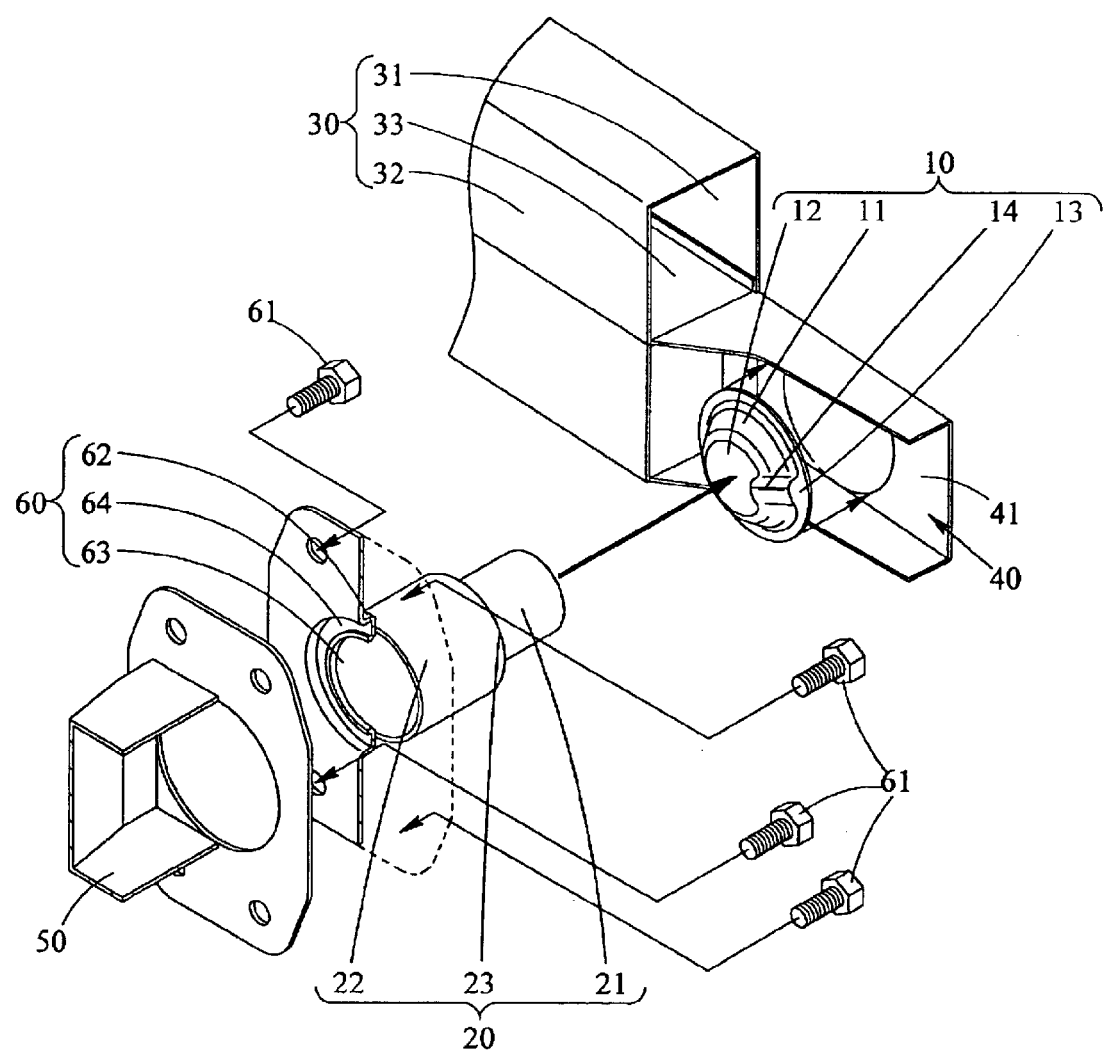
FIG. 8 is an exploded perspective view of the shock absorber shown in FIG. 7.

As seen in FIG. 7 and FIG. 8, the same bumper reinforcing member 30 and shock absorber as in the above-described embodiment are used, in which a first shock absorbing part 10 is welded to a fixing aid 40 and a second shock absorbing part 20 respectively in one body, so that the second shock absorbing part 20 supports the bumper reinforcing member 30 via the first shock absorbing part 10. Therefore, the fixing aid 40 in this embodiment does not need to be provided a rear surface portion to connect the shock absorber.

Figure 9:
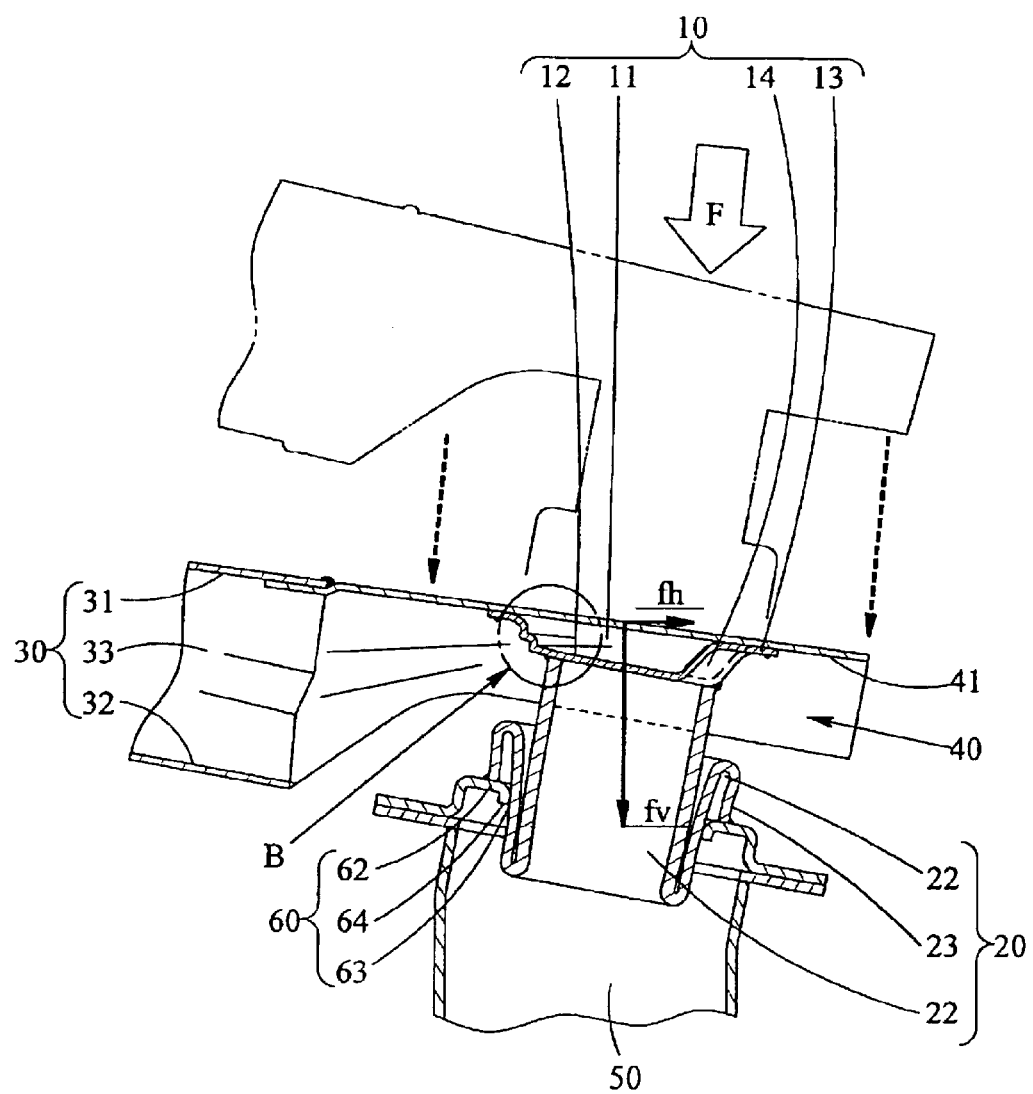
FIG. 9 is a cross-sectional view corresponding to FIG. 7, showing a shock absorber with an impact exerted thereon.

When the bumper reinforcing member 30 receives an impact force F in this embodiment, a bias of a collapse (at a part shown by an arrow B in FIG. 9) also occurs in the first absorbing part 10 owing to existence of a bead 14 as seen in FIG. 9, to cause a component of force fh for inclining the smaller-diameter tube portion 21 of the second shock absorbing part 20 to be reduced. This enables the direction of the transmission of the impact force to be corrected so that this transmission direction agrees with the axial direction of the second shock absorbing part 20. Accordingly, the inclination of the smaller-diameter tube portion 21 of the second shock absorbing part 20 can be suppressed or prevented.

The first shock absorbing parts 10 in the above-described embodiments have the same shape. In the embodiments seen in FIG. 1, FIG. 2 and FIG. 6, the front end of the smaller-diameter tube portion 21 of the second shock absorbing part 20 is only contacted with the top surface 12 of the first shock absorbing part 10. On the other hand, in the embodiment seen in FIG. 7 to FIG. 9, the front end of the smaller-diameter tube portion 21 of the second shock absorbing part 20 is fixed firmly to the top surface 12 of the first shock absorbing part 10.

Figure 10:
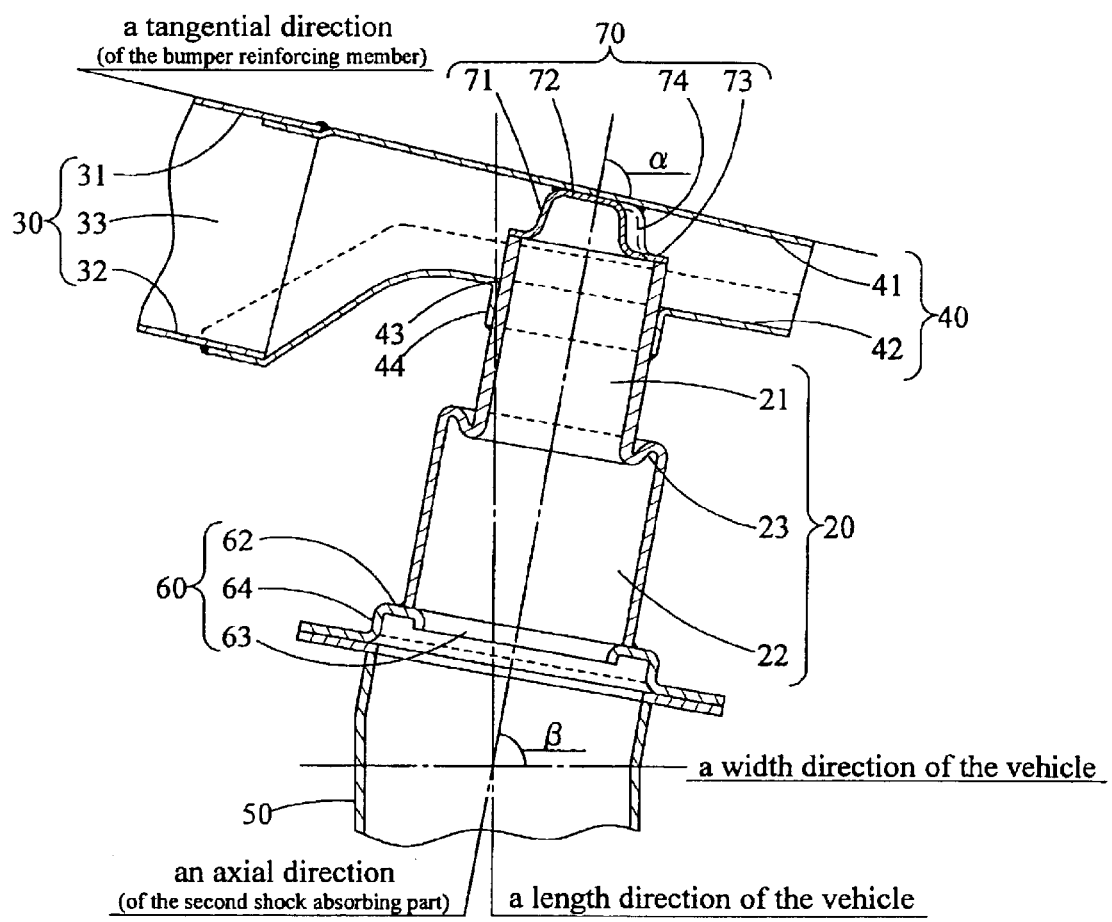
FIG. 10 is a cross-sectional view of a shock absorber, showing a still another example of the present invention.
Figure 11:
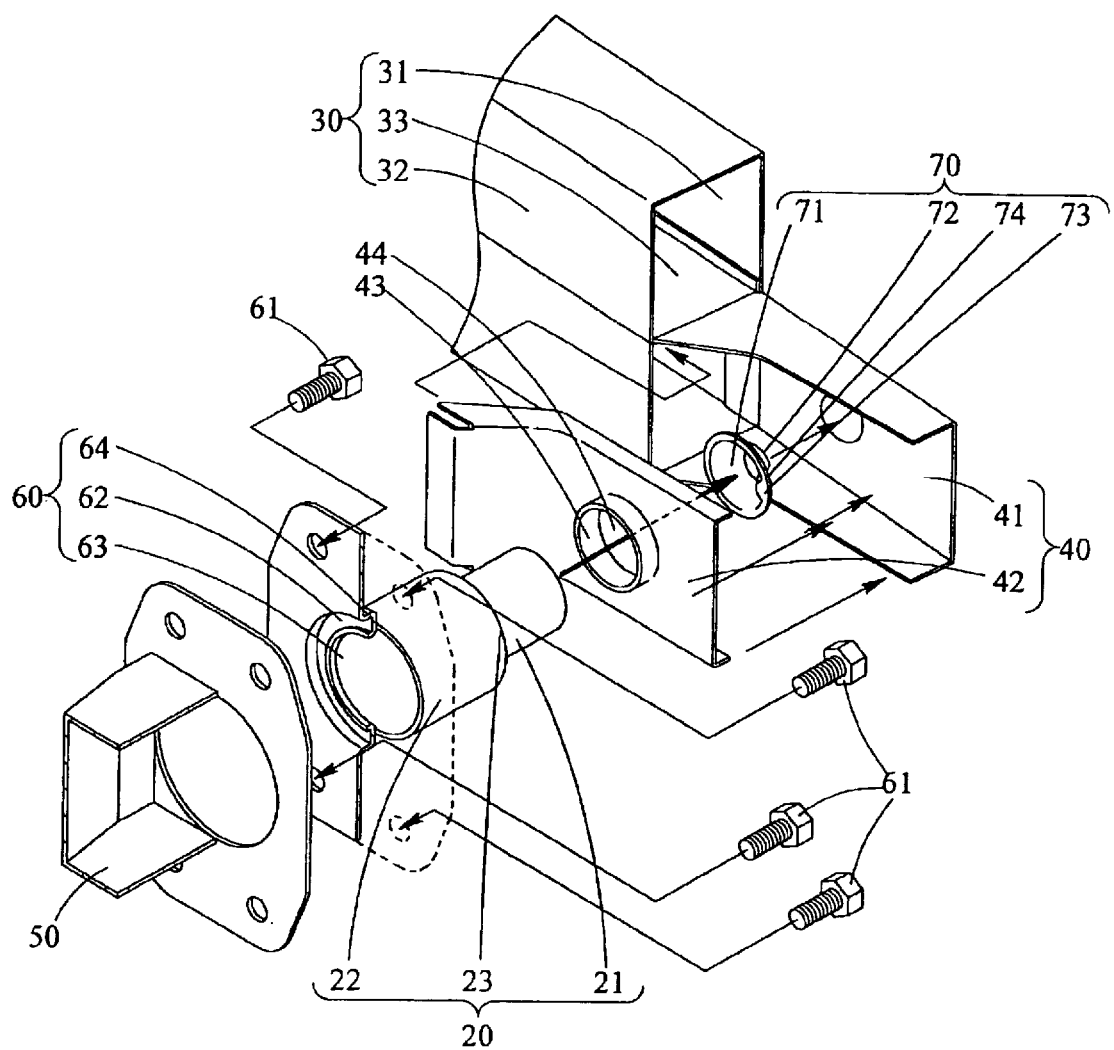
FIG. 11 is an exploded perspective view showing the assembling relation among a bumper reinforcing member, a shock absorber and a body member.
Figure 12:
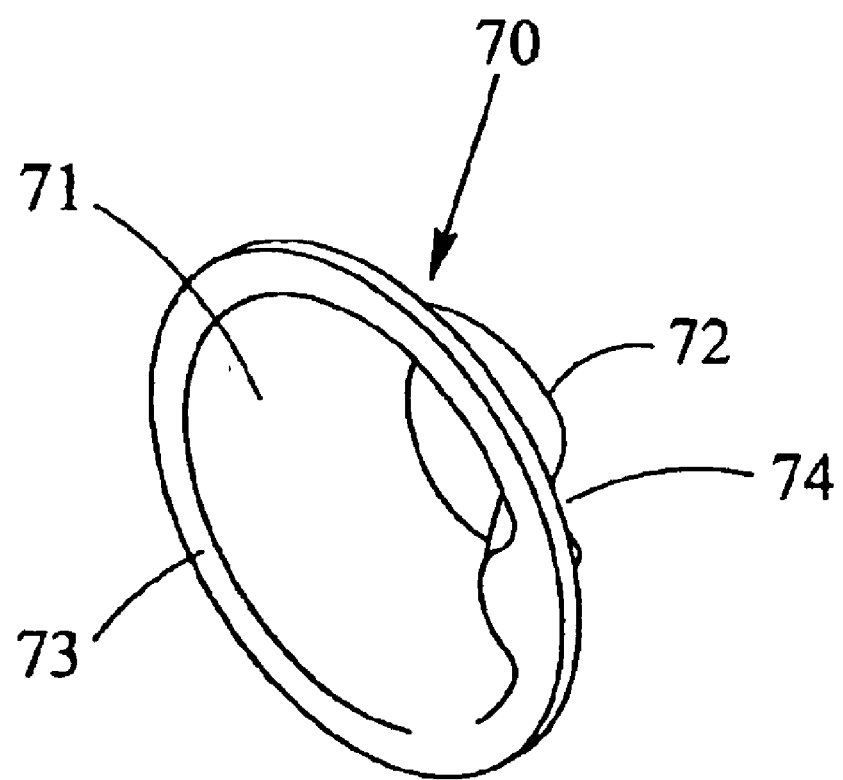
FIG. 12 is a perspective view of the first shock absorbing part viewed from the side of a second shock absorbing part.

In an embodiment seen in FIG. 10 and FIG. 11, a first shock absorbing part 70 having a structure of a basin-like truncated conical shape with an inclined side surface 71 obtained by opening a rear side thereof or converging thereof forwardly is used, and other parts, such as a bumper reinforcing member 30, a fixing aid 40 and a second shock absorbing part 20 are identical with those of each of the above-described embodiments. As seen in FIG. 12, the first shock absorbing part 70 has a top surface 72 surrounded by a smaller-diameter-side circumferential edge of the side surface 71, and an annular flange surface 73 projecting from a larger-diameter circumferential edge of the side surface 71 in the radially outward direction. Further, a bead 74 is integrally formed on the outer side of the side surface 71 with respect to the width direction of a vehicle, in which connects the larger-diameter-side circumferential edge and the smaller-diameter-side circumferential edge together. Since the first shock absorbing part 70 is small, the material cost can be reduced.

In this embodiment, the top surface 71 of the first shock absorbing part 70 is fixed by welding in a surface contacting state to a front surface portion 41 of the fixing aid 40. In addition, the annular flange surface 73 maybe fixed by welding in a surface contacting state to the smaller diameter tube portion 21 of the second shock absorbing part 20.

Figure 13:
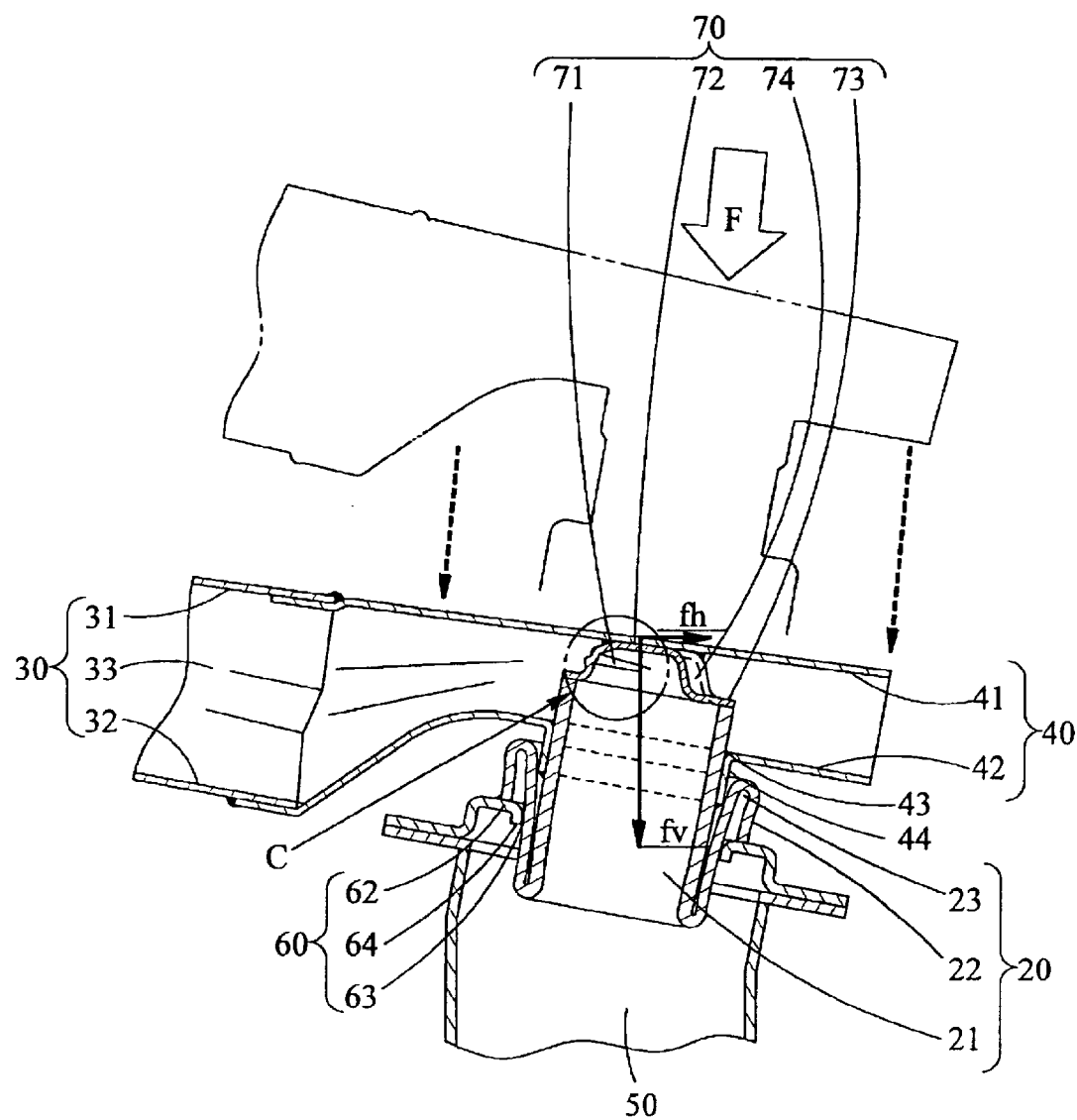
FIG. 13 is a cross-sectional view corresponding to FIG. 10, showing the shock absorber with an impact exerted thereon.

The first shock absorbing part 70 in this embodiment is different from the first shock absorbing part 10 in each of the above-described embodiments in the recessing direction thereof, but the condition of a collapse occurred when the bumper reinforcing member 30 receives an impact force F is substantially identical with that of a collapse of the first shock absorbing part 10, as seen in FIG. 13. Namely, in the first shock absorbing part 70 receiving the impact force F, the inner side with respect to the width direction of the side surface 71 thereof is collapsed since the rigidity of the outer side, on which the bead 74 is formed, with respect to the width direction of the side surface 71 is relatively high to thereby reduce a component of force fh (at the part shown by an arrow C in FIG. 13 and change the impact force transmission direction. This enables the inclination of the smaller-diameter tube portion 21 of the second shock absorbing part 20 to be suppressed or prevented.

What is claimed is:

1. A shock absorber adapted to support a bumper reinforcing member of a vehicle and absorb by plastic deformation of the shock absorber an impact exerted on the bumper reinforcing member, comprising a first collapsible shock absorbing part, and a second shock absorbing part adapted to be compressed in the axial direction thereof inclined outward in the width direction of a vehicle, the first shock absorbing part having a structure of a basin-like truncated conical shape and including a skirt-shaped side surface, a top surface surrounded by a smaller-diameter-side circumferential edge of the side surface, an annular flange surface projecting from a larger-diameter-side circumferential edge of the side surface in the radially outward direction, and a bead integrally formed on the side surface in connection between the larger-diameter-side circumferential edge and the smaller-diameter-side circumferential edge, whereby the shock absorber has a function of aligning a direction in which the impact exerted on the bumper reinforcing member with the axial direction of the second shock absorbing part while absorbing the same impact, and the second shock absorbing part having a function of absorbing an impact transmitted from the first shock absorbing part.

2. A shock absorber according to claim 1, wherein the second shock absorbing part has a multistage tubular structure including a smaller-diameter tube portion and a larger-diameter tube portion which are obtained by partially reducing or partially increasing a diameter of a straight tube, and a stepped portion connecting these two tube portions together in one body.

3. A shock absorber according to claim 1, wherein the bead has a cross-sectionally triangular shape having an opening angle within the range of plus or minus 45 degrees in the circumferential direction of the top surface at a center line extending outward from the center of the top surface in the width direction of the vehicle, and extends in connection between the larger-diameter-side circumferential edge and the smaller-diameter-side circumferential edge.

4. A shock absorber according to claim 1, wherein the bead has a cross-sectionally triangular shape having an opening side length within the range of 0.1 to 0.7 times as large as a diameter of the top surface at a center line extending outward from the center of the top surface in the width direction of the vehicle, and extends in connection between the larger-diameter-side circumferential edge and the smaller-diameter-side circumferential edge.

5. A shock absorber according to claim 1, wherein the bead has a cross-sectionally sector having an opening angle within the range of plus or minus 45 degrees in the circumferential direction of the top surface at a center line extending outward from the center of the top surface in the width direction of the vehicle, and extends in connection between the larger-diameter-side circumferential edge and the smaller-diameter-side circumferential edge.

6. A shock absorber according to claim 1, wherein the bead has a cross-sectionally sector having an opening side length within the range of 0.1 to 0.7 times as large as a diameter of the top surface at a center line extending outward from the center of the top surface in the width direction of the vehicle, and extends in connection between the larger-diameter-side circumferential edge and the smaller-diameter-side circumferential edge.

* * * * *